United States Patent [19]
Bailey et al.

[11] 3,942,838
[45] Mar. 9, 1976

[54] BIT COUPLING MEANS

[75] Inventors: Edward A. Bailey, Newport; Rene Pertusio, Goshen; George A. Hibbard, Claremont, all of N.H.

[73] Assignee: Joy Manufacturing Company, Pittsburgh, Pa.

[22] Filed: May 31, 1974

[21] Appl. No.: 474,895

[52] U.S. Cl. .................. 299/91; 403/320; 403/343
[51] Int. Cl.² ........................................ E21C 13/00
[58] Field of Search ............ 299/91; 403/320, 343; 173/131, 132, 133, 80; 175/412, 413; 285/92

[56] References Cited
UNITED STATES PATENTS

| | | |
|---|---|---|
| 2,049,289 | 7/1936 | Burns et al. .................... 403/320 X |
| 2,318,590 | 5/1943 | Boynton ......................... 403/320 X |
| 2,672,358 | 3/1954 | Wienola ......................... 403/320 X |
| 3,258,284 | 6/1966 | Phipps ............................... 403/343 |
| 3,544,166 | 12/1970 | Proctor .............................. 299/91 |
| 3,709,306 | 1/1973 | Curington ............................ 173/80 |
| 3,806,265 | 4/1974 | Hattan ........................... 403/320 X |

*Primary Examiner*—Frank L. Abbott

[57] ABSTRACT

A rock hammer and more particularly a rock hammer having thereon improved means for securing a cutting or breaking bit assembly thereto.

11 Claims, 3 Drawing Figures

BIT COUPLING MEANS

In the art of percussive tools there is known a variety of rock cutting and breaking apparatus such as rock hammers which are commonly employed in such operations as secondary breaking of boulders in a hard rock mine. Such tools have customarily included thereon a striking bar having a cutting or breaking bit assembly rigidly and releasably secured thereto by coupling means intended to provide efficient percussive load transmission from the rock hammer to the bit assembly and further to preclude spontaneous disengagement of the bit assembly coupling in response to the various modes of mechanical loading applied thereto during normal hammer operation.

Although heretofore known bit coupling means have generally served the intended purposes, they have nonetheless proven to be unsatisfactory in several respects. For example, in the prior art bit coupling means have often required relatively large notches or transverse bores to be formed in the striking bar shank adjacent the bit assembly secured thereto for the purpose of receiving therewithin a bit locking member such as a transverse pin or a wedge. During operation such notches or bores may produce sufficiently large stress concentrations in the striking bar to weaken the striking bar and precipitate mechanical failure thereof. One conventional means of securing a bit assembly to a striking bar without recourse to such notches or bores has been threaded engagement therebetween such as by means of well known rope threads or the like. This approach too has proven to be unsatisfactory due to the tendency of even very tightly threaded couplings to spontaneously loosen or disengage when subjected to the harsh mechanical shocks commonly generated by rock hammering operations.

The present invention provides improved coupling means for securing a bit assembly to such rock hammering apparatus as hereinabove cited without recourse to large notches or bores in the striking bar shank. The striking bar and bit assembly are thereby rendered stronger and more reliable than in prior structures. Additionally, the coupling means of the present invention positively locks the bit assembly in place thereby precluding spontaneous bit disengagement during hammer operation.

These and other objects and advantages of the present invention are more fully specified in the following description and illustrations in which.

Figure 1:
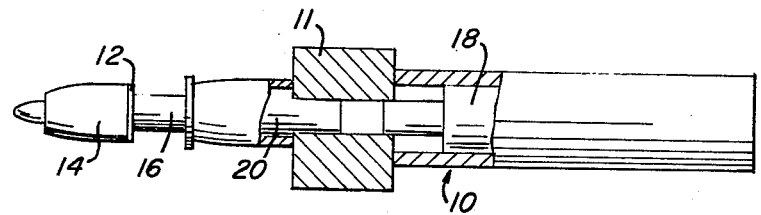
FIG. 1 illustrates partly in section a percussive rock hammer including a bit coupling assembly constructed in accordance with the principles of the present invention.

For purposes of illustrating and describing the present invention reference is made hereby to a percussive tool generally indicated at 10 in FIG. 1 and shown as a conventional rock hammer although it will be evident to those versed in the art that the present invention may be employed in conjunction with various other percussive tools as well such as rock drills and for such alternative uses as securing together axially adjacent drill steel segments. Hammer 10 includes: a bit assembly 14 which is releasably affixed to a well known striking bar 16 carried by the hammer 10; and a bit coupling assembly 12 carried by striking bar 16 and cooperable therewith to preclude spontaneous or inadvertent disengagement of the bit assembly 14.

The hammer 10 is well known to those versed in the art and in any case a detailed description thereof is not necessary for an understanding of the present invention. Therefore, suffice it to note for purposes of illustration that the hammer 10 as shown includes: a generally annular elongated body member 11 which carries coaxially adjacent the forward end thereof the striking bar 16; a massive hammer piston 18 reciprocably carried coaxially within body 11; and an anvil 20 carried within the body 11 coaxially intermediate bar 16 and piston 18 and adapted in a well known manner to provide impact transmitting communication therebetween. The hammer 10 is commonly employed to cut or break rock or rocklike material such as concrete by positioning the bit assembly 14 adjacent such material in suitable orientation for delivering percussive blows thereto by repetitive impacting of the piston 18 upon anvil 20 which, in turn, delivers the impact energy generated thereby via striking bar 16 and bit assembly 14 to the rock surface for the consequent cutting or breaking thereof.

Figure 2:
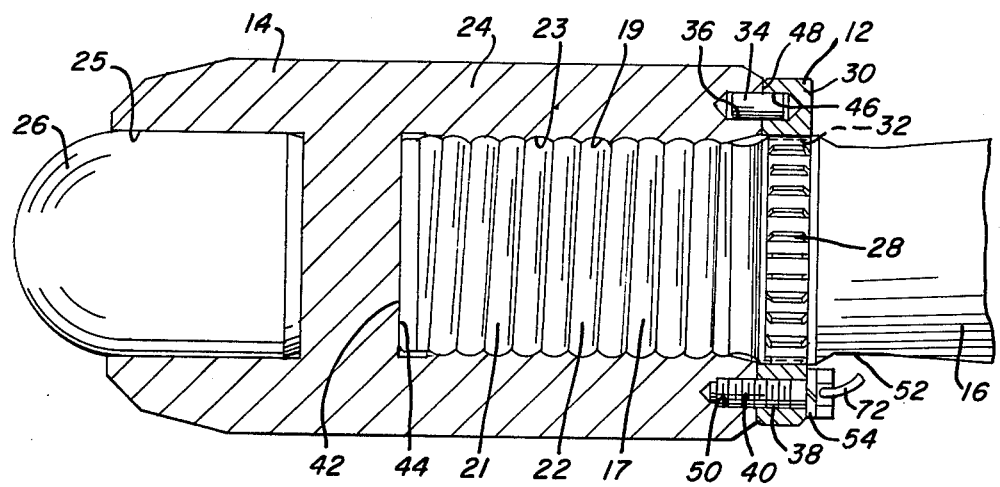
FIG. 2 illustrates partly in section a bit and bit coupling assembly constructed in accordance with the one embodiment of the present invention.

By reference to FIG. 2 it will be seen that the bit assembly 14 includes a generally cylindrical body member 24 which has a well known bit 26 rigidly secured as by a press fit or other suitable means within a recess 25 adjacent the forward end thereof. An axial bore 23 extends forwardly within body 24 from a rearward transverse end surface 48 thereof and is adapted by means shown as rope threads 19 extending upon a peripheral portion thereof to secure therewithin a forwardly extending generally cylindrical shank portion 17 of striking bar 16.

Shank 17 includes: a forwardmost transverse end surface 42; a generally cylindrical forward end portion 21 extending rearwardly from surface 42; a plurality of circumferentially spaced, longitudinally extending splines 28 encompassing a peripheral portion of shank 17 rearwardly adjacent the portion 21; a slightly necked down or reduced diameter portion 52 located rearwardly adjacent the splines 28; and rope threads 22 which extend axially upon portion 21 intermediate the surface 42 and splines 28 and are adapted to cooperate with mating rope threads 19 to secure shank 17 within the bore 23 as hereinabove indicated.

The bit locking assembly 12 includes: an annular bit locking member or ring 30 disposed coaxially with shank 17 in a manner so as to be axially movable with respect thereto; a plurality of circumferentially spaced longitudinally extending splines 32 which encompass an inner peripheral portion of the ring 30 and are cooperable with splines 28 to constrain the ring 30 against axial rotation with respect to bar 16; a plurality of circumferentially spaced forwardly extending shear pins 34 rigidly carried by ring 30 radially outwardly adjacent the splines 32 in any suitable manner as by being pressed fitted into a respective plurality of suitably oriented and sized bores 46; and a plurality of circumferentially spaced, axial through bores 38 extending within ring 30 intermediate adjacent pins 34 and adapted to receive threaded fasteners such as bolts 40.

In practice the end portion 21 of shank 17 is threadedly secured in the operational position thereof within bore 23 by cooperable engagement of threads 22 and 19 such that surface 42 abuts a forwardmost transverse end 44 of bore 23 in force transmitting engagement and surface 48 resides forwardly adjacent the splines 28. In this configuration substantially all impact forces may be transmitted from bar 16 to assembly 14 via the interface of surfaces 42–44 with supplementary impact transmitting capacity being provided by the cooperable engagement of threads 22–19. To secure the assembly 14 in the operating position described the ring 30 is positioned adjacent portion 52 to disengage splines 28 from splines 32 and is axially rotated with respect to the striking bar 16 to align the pins 34 for engagement thereof within a respective plurality of circumferentially spaced bores 36 which extend forwardly within body 24 from surface 48, and further to align bores 38 with a respective plurality of bores 50 extending forwardly within body 24 from the surface 48 and adapted by means of suitable threads therewithin (not shown) to receive the bolts 40. Additionally, the splines 32 must be aligned to engage splines 28. Once having attained the aligned configuration described, the ring 30 is moved axially forwardly to a position adjacent the surface 48 as illustrated in FIG. 2 whereat pins 34 extend within respective bores 36 and splines 32 engage splines 28. Finally, the bolts 40 are inserted through bores 38 and threadedly engaged within respective bores 50 to rigidly and releasably secure the ring 30 adjacent surface 48. Locking means to secure the bolts 40 may be employed, for example suitable spring biased lock washers 54 or a lock wire 72 inserted through suitable bores as shown in the heads of bolts 40 and secured in the customary manner. By virtue of the assembly described the ring 30 is constrained against axial rotation with respect to the bar 16 by engagement of splines 28–32, and the assembly 14, being rigidly keyed to ring 30 by means of pins 34 and bolts 40, is also constrained against axial rotation with respect to bar 16 whereby substantially full threaded engagement of shank 17 within bore 23 is positively secured.

It is of course evident that the mating splines 32–28 are engageable only at discrete angular intervals, for example regular intervals of 6° for a 60 tooth spline. Thus, it is entirely possible that when the assembly 14 is fully threaded onto shank 17 as described hereinabove the bores 36 and 50 may be out of register with respective pins 34 and bores 38 of ring 30 by an angular misalignment not exceeding the angle between adjacent mating positions of splines 28–32, and therefore in order to accommodate ring 30 as described the assembly 14 may have to be loosened by adjustment thereof through a slight axial rotation with respect to bar 16 to correct such misalignment. Any loosening of assembly 14 from full engagement of the threads 22–19 is undesirable and therefore in order to minimize the magnitude of such adjustments special arrangements of bores 38, pins 34 and splines 28–32 are provided as follows.

Ideally the respective bores 38 and pins 34 are arranged in alternating order and are evenly spaced circumferentially about ring 30 so as to register in a plurality of angular positions with a like arrangement of the respective bores 36 and 50. Additionally, the number of individual spline teeth 32 and 28 is ideally not an even multiple of the number of pins 34; that is, the ratio of the number of splines 32–28 to the number of pins 34 is not a whole integer number. Such an arrangement of splines 32–28 and pins 34 provides a plurality of distinct and non-reduntant angular positions for engagement of splines 28–32, each of which positions provides at least near-register of pins 34 with respective bores 36 and each of which requires an angular adjustment of assembly 14 of less than the angular interval between adjacent splines 28–32. In assembly, the most closely aligned of such positions may be selected by a process of elimination and the assembly 14 may be adjusted slightly to perfect the register of pins 34 in such position with bores 36 prior to final assembly and insertion of bolts 40. This provision for a plurality of non-redundant mating configurations between ring 30 and assembly 14 substantially reduces the maximum required adjustment of assembly 14 thereby permitting the assembly 14 to be secured to striking bar 16 in substantially full threaded engagement therewith.

Figure 3:
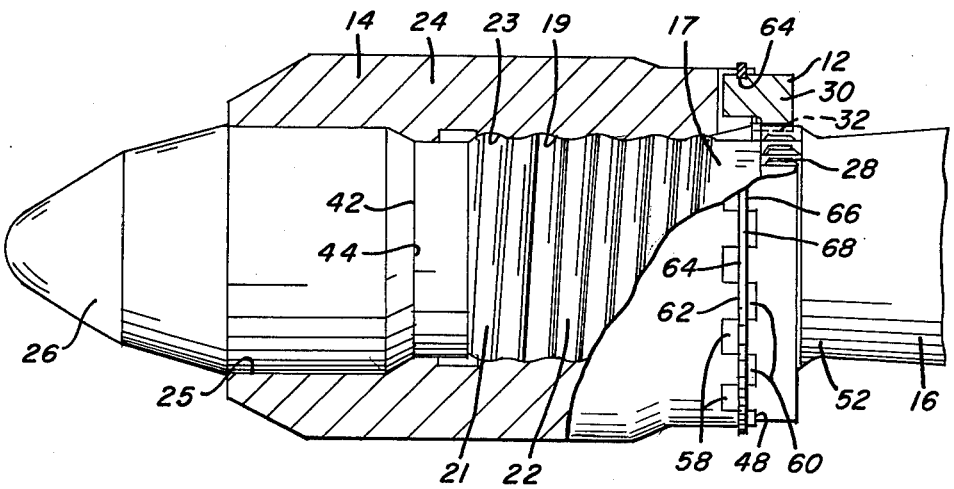
FIG. 3 illustrates partly in section a bit and bit coupling assembly constructed in accordance with an alternative embodiment of the present invention.

There is illustrated in FIG. 3 an alternative embodiment of the present invention wherein interlocking lugs replace the previously described pins 34 and a spring biased fastener replaces the bolts 40 in the following manner.

In FIG. 3 the structure and assembly of assembly 14 and striking bar 16 are substantially as previously described with reference to the embodiment illustrated in FIG. 2. However, in the present embodiment the ring 30 includes: a plurality of circumferentially spaced, forwardly extending lug portions 58 which are adapted to engage a mating plurality of rearwardly extending lug portions 60 formed adjacent end surface 48 of body 24; and a plurality of circumferentially extending aligned groove portions 62 which extend adjacent an outer peripheral portion of lugs 60 and are adapted to register with a corresponding plurality of circumferentially extending aligned groove portion 64 extending adjacent an outer peripheral portion of lugs 58. The number of splines 32–28 preferably is not an even multiple of the number of lugs 58–60, whereby a plurality of non-redundant mating configurations of ring 30 and assembly 14 is provided in substantially the manner described hereinabove.

In practice the body 24 is threadedly engaged upon shank end portion 21 and ring 30 is positioned adjacent shank portion 52 and axially rotated to align splines 28–32 and also to select the most nearly aligned configuration of lugs 58–60. Assembly 14 is adjusted as necessary to perfect the alignment of respective lugs 58 and 60, and the ring 30 is then moved forwardly to a position adjacent surface 48 to engage corresponding lug portions 58 and 60 and corresponding splines 28–32. In the assembled configuration the aligned groove portions 62 and 64 form a continuous circumferential groove 66 which is adapted to receive a generally hoop-like spring biased fastener member 68 such as a snap ring which acts to key respective adjacent lug portions 58 and 60 together to preclude axial separation thereof. Thus, by virtue of the structure illustrated in FIG. 3 the ring 30 is constrained against axial rotation with respect to bar 16 by engagement of splines 28–32 and assembly 14 is likewise constrained against axial rotation with respect to bar 16 by engagement of lug portions 58 and 60, which engagement is maintained by the snap ring 68 as described. The substantially full threaded engagement of shank 17 within bore 23 is thus secured against spontaneous disengagement.

According to the present invention as illustrated and described a structure is provided whereby a bit assembly may be rigidly and releasably affixed to a striking bar and positively secured against inadvertent or spontaneous disengagement therefrom by engaging an annular member keyed to the striking bar and being thereby constrained against axial rotation with respect thereto.

Notwithstanding the reference hereinabove to specific embodiments of the present invention, it is to be understood that this invention may be practiced in various alternative embodiments and may be modified in numerous ways without departing from the broad spirit and scope thereof. For example: rope threads 22 and 19 may be replaced by such securing means as a bayonet type fastener; the plurality of pins 34 and bores 38 may be replaced by a single such pin 34 and bore 38, each adapted to register with any of a plurality of respective bores 36 and 50; and the like.

Inasmuch as these and other embodiments of the present invention and modifications thereto have been envisioned and anticipated it is intended that the invention be interpreted broadly and limited only by the scope of the claims appended hereto.

What is claimed is:

1. In a coupling assembly for coupling a working member in coaxial alignment with an elongated force transmitting member, the improvement comprising: rigid means adapted to receive portions of said members within respective axial end portions thereof and cooperable with respective adjacent peripheral surfaces of said members to maintain said coaxial alignment; locking means having an internal portion thereof cooperable with an adjacent external portion of said force transmitting member to provide a selectively adjustable circumferential alignment therebetween; and securing means cooperable with portions of said rigid means and said locking means to positively maintain said selectively adjustable circumferential alignment and to maintain a circumferential alignment between said rigid means and said locking means.

2. A coupling assembly as specified in claim 1 wherein said rigid means threadably receives said portion of said force transmitting member within said respective axial end portion thereof.

3. A coupling assembly as specified in claim 1 wherein said working member is a bit and said force transmitting member is a striking bar.

4. A coupling assembly as specified in claim 1 wherein said internal portion of said locking means and said external portion of said force transmitting member are cooperably splined to maintain said selectively adjustable circumferential alignment.

5. A coupling assembly as specified in claim 4 wherein said rigid means threadably receives said portion of said force transmitting member within said respective axial end portion thereof.

6. A coupling assembly as specified in claim 5 wherein said external portion of said force transmitting member is located intermediate the longitudinal ends of said force transmitting member.

7. A coupling assembly as specified in claim 4 wherein said locking means is an annular locking ring surrounding said force transmitting member.

8. A coupling assembly as specified in claim 7 wherein said securing means includes a plurality of circumferentially spaced members extending between said rigid and locking means in a direction generally parallel to the longitudinal axis of said force transmitting member.

9. A coupling assembly as specified in claim 8 wherein the number of said circumferentially spaced members is an odd multiple of the number of said splines.

10. A coupling assembly as specified in claim 7 wherein said securing means includes an annular snap ring cooperable with interengaging tongue and groove portions of said rigid and locking means.

11. A coupling assembly as specified in claim 10 wherein the number of said tongue and groove portions is an odd multiple of the number of said splines.

* * * * *